United States Patent
Bonfrer

(10) Patent No.: US 8,453,185 B2
(45) Date of Patent: May 28, 2013

(54) DATA TRANSMISSION FROM A SET-TOP BOX

(75) Inventor: David Bonfrer, Vriezenveen (NL)

(73) Assignee: EchoStar Global B.V., Almelo (NL)

( * ) Notice: Subject to any disclaimer, the term of this patent is extended or adjusted under 35 U.S.C. 154(b) by 959 days.

(21) Appl. No.: 12/330,169

(22) Filed: Dec. 8, 2008

(65) Prior Publication Data

US 2010/0146560 A1  Jun. 10, 2010

(51) Int. Cl.
H04N 7/18 (2006.01)

(52) U.S. Cl.
USPC ............. 725/81; 725/58; 725/74; 725/82; 725/85; 725/18

(58) Field of Classification Search
USPC ............ 725/58, 62, 81, 99, 82; 709/227–237; 348/552
See application file for complete search history.

(56) References Cited

U.S. PATENT DOCUMENTS

| | | | |
|---|---|---|---|
| 7,103,315 B2 * | 9/2006 | Wilkinson | 455/41.2 |
| 7,457,582 B2 * | 11/2008 | Kamada et al. | 455/3.01 |
| 7,877,776 B2 * | 1/2011 | Krikorian et al. | 725/95 |
| 2004/0237104 A1 * | 11/2004 | Cooper et al. | 725/38 |
| 2006/0117371 A1 * | 6/2006 | Margulis | 725/131 |
| 2007/0078928 A1 * | 4/2007 | Yang et al. | 709/203 |
| 2007/0079341 A1 * | 4/2007 | Russ et al. | 725/89 |
| 2007/0124775 A1 | 5/2007 | Dacosta | |
| 2007/0180485 A1 * | 8/2007 | Dua | 725/114 |
| 2008/0229375 A1 * | 9/2008 | Roberts et al. | 725/100 |
| 2009/0113472 A1 * | 4/2009 | Sheth et al. | 725/34 |
| 2010/0005483 A1 * | 1/2010 | Rao | 725/25 |
| 2010/0071007 A1 * | 3/2010 | Meijer | 725/58 |

FOREIGN PATENT DOCUMENTS

| | | |
|---|---|---|
| WO | WO 03/043326 | 5/2003 |
| WO | WO 2004/088983 | 10/2004 |
| WO | WO 2005/051022 | 6/2005 |
| WO | WO 2007/000455 | 1/2007 |

OTHER PUBLICATIONS

International Search Report and Written Opinion dated Mar. 9, 2010, PCT/EP2009/066272, 15 pages.

* cited by examiner

Primary Examiner — Pankaj Kumar
Assistant Examiner — Timothy Newlin
(74) Attorney, Agent, or Firm — Kilpatrick Townsend & Stockton LLP

(57) ABSTRACT

A method for transmitting data between two devices, such as a set-top box and a mobile device. The user of the mobile device may view the transmitted data as it is received by the mobile device. The data may be transmitted via UMTS. Additionally, the user may be allowed to view data because the user has a subscription to access the data through the set-top box. Furthermore, the set-top box may send a notification to the user to query whether the set-top box should transmit the data to the mobile device. In the case that the user responds and requests the data to be transmitted to the mobile device, the set-top box may transmit the requested data to the mobile device.

20 Claims, 4 Drawing Sheets

DATA TRANSMISSION FROM A SET-TOP BOX

BACKGROUND

1. Technical Field

The present invention generally relates to streaming video and, more specifically, to streaming video from a receiver to a mobile device.

2. Background Discussion

Video programming may be downloaded onto various devices including set-top boxes, digital video recorders, computing systems, mobile devices and so on. In some cases, a user must subscribe to a provider in order to access specific video programming. For example, the user may purchase a subscription to a satellite provider. The subscription may allow the user to access and download various programs for viewing on a television.

Additionally, users may view video programming on mobile devices such as cell phones, personal digital assistants, media players, handheld computing devices and so on. Mobile devices may provide a variety of user functions. More specifically, many mobile devices may be used as a media player to listen to audio, such as music, and/or watch video. However, in many cases, the media may have been previously downloaded and stored in the memory of the mobile device or streamed via an Internet Protocol ("IP") connection.

In one example, the user may select the desired media for use on the mobile device and then download the desired media. For example, the user may select a list of songs and/or videos to be viewed on their mobile device and then may download this data to the device. The downloaded data may be stored and viewed immediately or at a later time. Although media files may be compressed or may reduce resolution to reduce file size, the amount of data downloaded onto the mobile device may be limited by the memory capacity of the mobile device. Also, the user may have to purchase an additional subscription to download media onto the user's mobile device. In some cases, the user may employ a smart card in conjunction with the mobile device in order to access the media. Once the user accesses the media, the user may download the desired media via an IP connection.

Thus, an improved method of downloading data to a mobile device is desirable. Accordingly, there is a need in the art for an improved method of transmitting data between devices.

SUMMARY

One embodiment of the present invention takes the form of a method for transmitting data from a receiver to a mobile device. A receiver may receive an indication from a content provider. The indication may signal a beginning of the data being received at the receiver. The receiver may determine that the data has been pre-selected and in response to determining that the data has been pre-selected, the receiver may generate a message. The receiver may transmit a message to the mobile device and may receive a reply from the mobile device. In response to receiving the reply, the receiver may transmit the data to the mobile device. The indication associated with the data may indicate that the data will be transmitted by the content provider within a predetermined time and may also be an initial portion of the data. The message may be transmitted to the mobile device via at least one of a short message service or a multimedia message service and may be transmitted from the receiver to a facility of the content provider, and retransmitted from the facility to the mobile device.

The receiver may be a television receiver (such as a cable receiver or other set-top box) and the mobile device may be a mobile telephone. Additionally, the receiver may determine that the user has pre-selected the data for streaming to the mobile device, may determine that the content provider has pre-selected the data for streaming to the mobile device and may determine that the user has pre-selected the data for storage. The receiver may also determine that the data has been pre-selected and further, that the data belongs to a user selected content category.

In another embodiment, the present invention may take the form of a method for transmitting and receiving data. In response to an indication associated with a second set of data, a first device may receive a request for a first set of data, where the indication may signal a beginning of the second set of data being received at the receiver. The first device may transmit a first set of data to a second device, may receive a request for the second set of data, may access the second set of data and may transmit the second set of data to the second device. The first device may not transmit the second set of data in the absence of the request for the second set of data. However, when the first device receives the request for the second set of data, the first device may transmit the second set of data substantially as the first device receives the second set of data. The first device may also transmit at least one of the first set of data and the second set of data via a universal mobile telecommunications service. Additionally, the first device may be a television receiver and the second device may be a mobile phone. The indication associated with the data may indicate that the data will be transmitted by the content provider within a predetermined time.

In yet another embodiment, the present invention may take the form of a method viewing video programming. In response to a reminder from a set-top box, where the reminder signals a beginning of the second set of data being received at the set-top box, the set-top box may receive a request for data. The set-top box may transmit data to a mobile device and may employ a smart card. The set-top box may receive the data from a source before the set-top box transmits the data to the mobile device and may process the data on the mobile device as the mobile device receives the data. Additionally, the source may be a satellite provider. The data may be transmitted from the set-top box to the mobile device via a universal mobile telecommunications service and may be transmitted substantially as the set-top box receives the data. Further, the set-top box may transmit the response to the reminder from the set-top box after determining the data has been pre-selected.

DETAILED DESCRIPTION OF EMBODIMENTS

Figure 1:
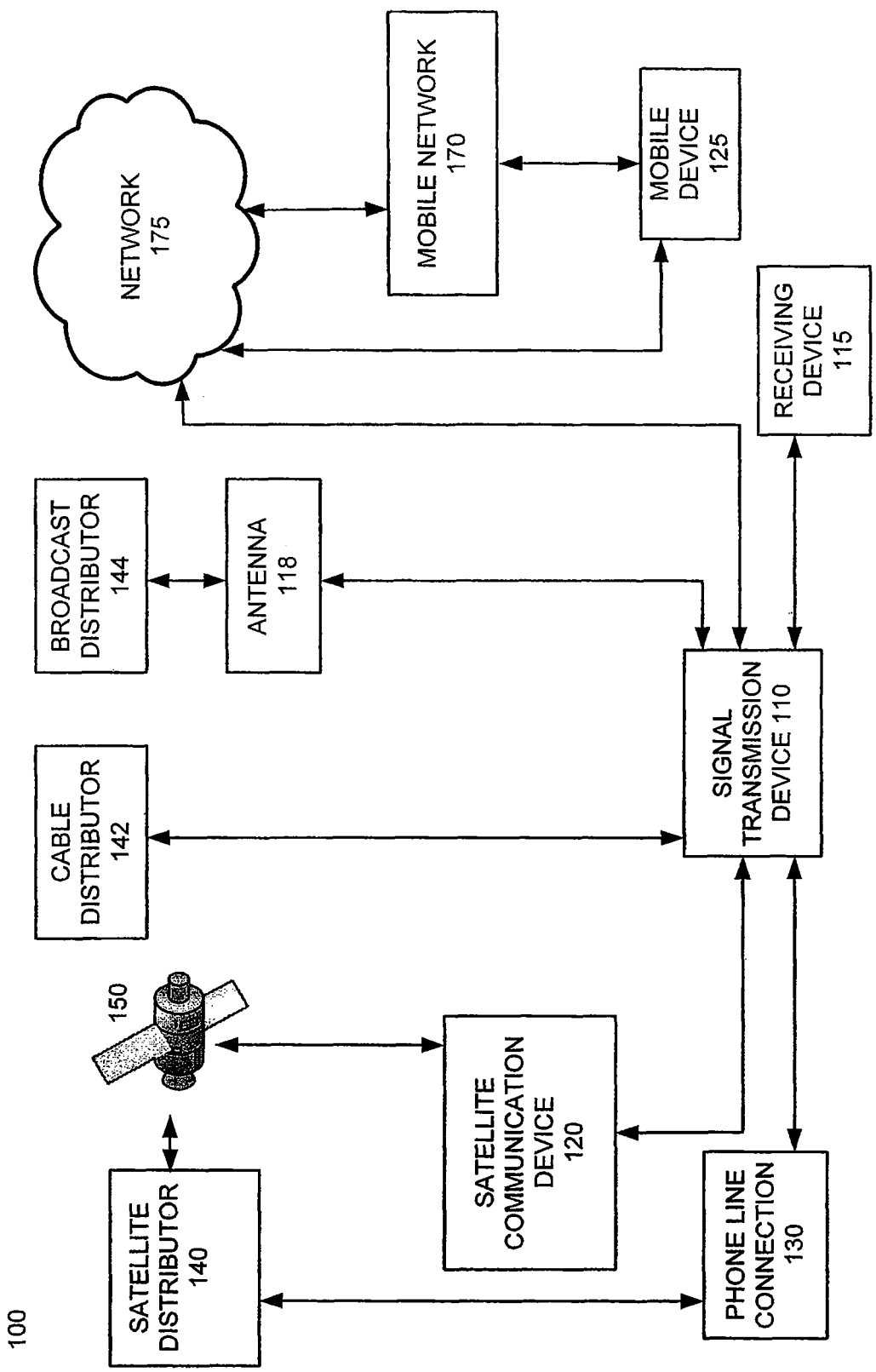
FIG. 1 depicts an example of a system for transmitting and receiving at least video signals.

Generally, one embodiment of the present invention may take the form of a method for transmitting and receiving information between two devices. For example, a signal transmission device may receive a request for information from, and transmit the requested information to, a requesting device. The requested information may be related to a program or other audiovisual data. As one example, the requested information may be a program guide or metadata for the aforementioned program, such as a program name,. After receiving the requested information, the requesting device may initiate a request for additional data to the signal transmission device. This additional data may be, for example, an audiovisual stream such as audiovisual entertainment accessed through, or related to, the aforementioned program guide or metadata. The signal transmission device may relay this additional data to the requesting device as it receives the data from an outside source, such as a broadcasting satellite, cable head end and so forth. The requesting device may process the data as it receives the data. Communication between the transmitting and receiving devices may be via a universal mobile telecommunications service ("UMTS").

Another embodiment may take the form of a method of transmitting data between a signal transmission device and a mobile device. One sample signal transmission device may be, for example, a television receiver configured to receive broadcasts from one or more satellites. In this embodiment, the television receiver may transmit a message, such as a text message, to the mobile device. The mobile device may display the text message to a user and permit the user to access certain functionality in response to receiving the text message.

As one example, the text message may inform the user that a particular program is being received by the television receiver and is available for viewing on the mobile device. Upon receiving the message, the user may employ the mobile device to instruct the television receiver to transmit an audiovisual data stream (e.g., a program, movie, video, music and so forth) to the mobile device via a UMTS link. The mobile device's instruction to the set-top box may be a request for additional data from the television receiver (e.g., a request for the audiovisual data stream). Once the set-top box receives the mobile device response, the set-top box may respond accordingly. For example, in the case the mobile device response requests additional data, the set-top box may transmit the requested data to the mobile device. As above, The requested data may be transmitted from the television receiver to the mobile device via a universal mobile telecommunications system ("UMTS"). Generally, references herein to a set-top box are intended to include the broader category of television receivers, such as digital video recorders, cable receivers, and so forth, as appropriate.

Yet another embodiment may take the form of a method for allowing a user to download and view video data on a mobile device. In this embodiment, the user may request video data from the set-top box. The video data may be transmitted first from the satellite provider to the set-top box and relayed to the mobile device as a UMTS communication by the set-top box. In some embodiments, the mobile device may access the video data even though it may not have a dedicated smart card or have previously stored the video data. (It should be noted that the terms "audiovisual data" and "video data" are used interchangeably herein; both refer to data including audio information, video information, or a combination of both.)

It should be noted that embodiments of the present invention may be used in a variety of satellite systems and video/audio processing systems. Embodiments may include or work with a variety of display components, electrical components, mobile devices, cellular devices and/or systems, communication systems, entertainment systems, receivers, transceivers, transmitters, converters, set-top boxes, televisions, and so on. Aspects of the present invention may be used with practically any apparatus related to receiving and transmitting signals, satellite systems, cellular devices and/or systems, entertainment systems, mobile devices, portable devices or any apparatus that may contain any type of display system or communication system. Accordingly, embodiments of the present invention may be employed in computing systems, satellite systems, cable systems, cellular systems, communications systems and devices used to process, transmit and/or receive signals and peripherals and so on.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

FIG. 1 depicts a sample system 100 including a signal transmission device 110, a mobile device 125, a satellite communication device 120, an antenna 118, a phone line connection 130 (or other network connection) and at least one display device 115 such as, but not limited to, a television 115. The signal transmission device 110 may be any type of television receiver. For example, it may be a satellite set-top box, a digital video recorder ("DVR"), a cable box and so on. The signal transmission device 110 may be a self-enclosed unit, may be implemented as several separate units or may be included within a television. Additionally, the signal transmission device 110 may include or be connected to a DVR. The signal transmission device 110 may be referred to herein as a "set-top box," although such reference is intended to encompass the other previously-mentioned examples of signal transmission devices and other variants thereof. Generally, the set-top box may receive data from a content provider, such as satellite distributor 140 or broadcast distributor 144, and transmit data to, for example, a mobile device 125. The set-top box may transmit either data that is stored in an associated memory or may relay in substantially real time data received from a content provider.

The mobile device 125 may be, for example, a cell phone, a personal digital assistant ("PDA"), a portable computing system, a handheld computing device, a multimedia player such as an audio player and/or a video player, a Bluetooth device and so on. The mobile device 125 may be used for transmitting, receiving, storing and/or viewing data, including audiovisual data. Mobile devices may incorporate a variety of functionality and//or subsystems, such as a phone, camera, media player, address book, global positioning system ("GPS") and so on. The mobile device may transmit and/or data using any of the available standards such as, but not limited to, Global System for Mobile Communications ("GSM"), Code Division Multiple Access ("CDMA"), UMTS and so on.

Generally, the set-top box 110 may receive signals from a cable distributor 142 through a cable network (not shown), a broadcast distributor 144 via the antenna 118 and/or a satellite distributor 140 via the satellite communication device 120 (e.g., satellite antenna). Each of the cable distributor 142, broadcast distributor 144 and satellite distributor 140 may provide audiovisual content or other data. However, the data may be provided through a different transmission medium by each of the distributors 140, 142, 144. Information may be downloaded from a number of sources onto the set-top box. The information may be downloaded onto the set-top box wirelessly, through an Internet Protocol ("IP") connection, through a satellite signal and so on. The wireless connections may be an infrared ("IR") signal, radio frequency ("RF") signal, wireless IP connection, cellular, WiMax, UMTS, satellite signal, combinations thereof or otherwise.

As one example, the satellite distributor 140 may transmit one or more satellite signals containing audiovisual data such as a movie or television program, to one or more satellites 150. In turn at least one of the satellites 150 may transmit the signal to the subscriber's set-top box 110. The transmitted signals may be received by the satellite communication device 120 which may take the form of, but is not limited to, a satellite dish 120. Generally, a satellite dish may initially process the transmitted signals by filtering noise from the transmitted signal, down-converting the transmitted signal, de-polarizing the transmitted signal and so on. The transmitted signal may be down-converted for transmission along a cable, such as coaxial a cable, to the set-top box 110. Other methods and systems as known in the art may be employed to deliver the satellite signal to the set-top box 110.

The set-top box may process received audiovisual data and may send the resulting processed signals to peripheral electronic components such as a display device 115, other set-top boxes, handheld computing devices, mobile devices, personal digital assistants, cell phones, computing systems and so on. The set-top box may communicate with the peripheral electronic components through any combination of wired and wireless connections.

Additionally, the set-top box 110 may also communicate with the satellite distributor 140 via the phone line connection 130. In one example, the set-top box may require an appropriately authorized smart card in order to gain access to specific video programming. The functionality of the set-top box 110 and the use of smart cards in conjunction with the set-top box will be described in further detail below.

The set-top box 110 may communicate with various devices such as other set-top boxes, controllers, video display devices, mobile devices and so on. For example, as depicted in FIG. 1, the set-top box 110 may communicate with a mobile device 125. Generally, mobile devices may communicate with other devices through at least a mobile network 170. As also shown in FIG. 1, the set-top box 110 may communicate with other devices through a number of different types of networks 175 such as, but not limited to, the Internet, the mobile network 170 and so on.

Still with respect to FIG. 1, data may be downloaded onto and stored on the mobile device 125 through a mobile network 170, a network 175, or both a network 175 and a mobile network 170. One example of a network 175 is the Internet. In one example, the mobile device 125 may download streaming video data from the Internet and present it to a viewer in substantially real time. Generally, streaming data may be substantially continuously transmitted and used or viewed by the user as it is received.

In order to access data on a mobile device, users may subscribe to a variety of services and/or plans. For example, the user may subscribe to a service plan which allows the mobile device to access, receive and transmit information over the mobile network. Continuing the example, the user may wish to view a certain video program on the mobile device 125, so the user may additionally subscribe to a video programming service. In some embodiments, a smart card paired with, or located in, the mobile device may uniquely identify the device and permit it to access audiovisual data (such as the video program). The subscriber identity module card used with many mobile telephones is but one example of a suitable smart card. In short, this smart card may contain data uniquely identifying the device and/or user, which may then allow the user to access a network and/or data which might otherwise be inaccessible to the subscriber.

In some embodiments, a user may stream video data from a set-top box to a mobile device for viewing or storage substantially as the set-top box receives the video data from a content provider. Insofar as the set-top box includes an authorized smart card permitting access to the aforementioned video data, the mobile device need not employ a separate smart card even though it may be downloading video data. Stated differently, the set-top box may receive and decrypt the data and may transmit the decrypted data to the mobile device. Accordingly, the mobile device may not need any type of authorization or decryption software or hardware to access and/or view the data and the set-top box may be used interchangeably with multiple mobile devices individually or simultaneously.

It should be noted that the set-top box may recode video program data at a lower bit rate for transmission to a mobile device than the encoded bit rate of the data as received by the set-top box. In short, the set-top box may compress, reduce the resolution of, or otherwise downconvert the video data for transmission to the mobile device. Video data may be encoded or compressed according to any known standard, such as the MPEG, MPEG-1, MPEG-2 or MPEG-4 standards.

In some embodiments, the user may request video programming information from the set-top box to the mobile device, such as a program menu and the airtimes of specific programs. Similar to previously discussed embodiments, the set-top box may receive the request via its IP connection. The set-top box 110 may transmit the program menu data to the mobile device via any number of connections including, but not limited to, a wired or wireless IP connection, UMTS, mobile network, short message service ("SMS") and so on. The user may view the program menu (typically, but not necessarily, on the mobile device itself) and interact with it to choose a particular set of video data to be transferred to the mobile device or other display device 115. For example, the video programming information may be an interactive program menu from which the user may select a particular program or other content for delivery to the mobile device. In response to the user's selection, the mobile device may transmit a request for associated video data to the set-top box 110 via the mobile network, the Internet, or any suitable network or combination of networks.

Once the set-top box 110 receives the video data request, it may transmit the data to the set-top box. It should be noted that the video data may be transmitted to the mobile device substantially as the set-top box receives the data from the satellite 150 or content provider, or may transmit the video data from an associated storage such as the memory of a DVR. In cases where the set-top box is receiving "live" programming or data that is being currently broadcast, substantial real-time streaming may be employed. However, it should be appreciated that certain embodiments may permit the mobile device to receive previously stored video data. Regardless of whether the data is streamed in real time or from a storage device, the mobile device may receive the video data via UMTS. It should also be appreciated that the user may either view the video data on the mobile device as it is received or the mobile device may store the video data on an associated storage for later playback. Examples of associated storage include internal magnetic storage, flash cards, smart cards, volatile and nonvolatile memory, and so forth.

Figure 2:
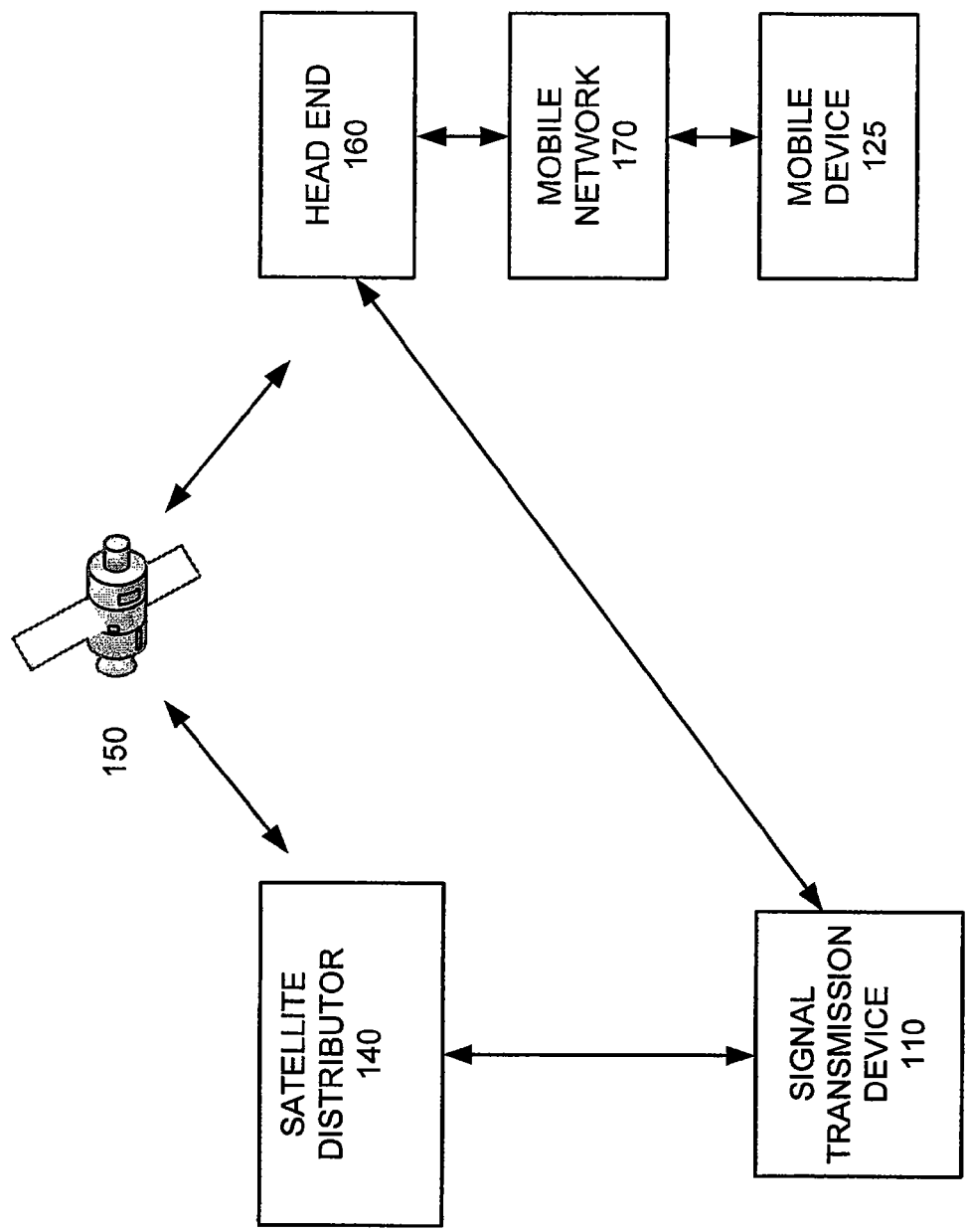
FIG. 2 depicts another example of a system for transmitting and receiving information between a mobile device and a signal transmission device.

FIG. 2 depicts another example of a system 200 that may be used for transmitting and receiving information between a mobile device and a signal transmission device such as a set-top box 110. Similar to FIG. 2, system 200 may include a set-top box 110 and a mobile device 125. The set-top box may transmit a message to the mobile device via a head end 160. Generally, the head end may be a facility where the television signal may be received, stored, processed and transmitted by the provider to a satellite 150 or other transmission device, and ultimately to the subscribers. The head end may receive any type of audiovisual program (including television programs) and may process the programs format them into the appropriate transmission format so the programs may be broadcast to the subscribers. Thus, with respect to a satellite-based content provider, an uplink facility may be considered a "head end."

Continuing the description of this embodiment, the set-top box 110 may employ a smart card. As previously discussed, the smart card may contain subscriber information and/or information regarding which particular channels, programs, and so on a particular subscriber is authorized to receive, thus allowing the subscriber to access data which might otherwise be inaccessible to the subscriber.

At certain times, the set-top box may generate and transmit a message to a user's/subscriber's mobile device. The transmitted message may notify the user that a program is being received from a content provider at a certain time, or is otherwise available. The set-top box may be configured to generate these messages whenever a particular program is received by the set-top box or only during periods when the user has activated this feature of the set-top box. For example, the user may only wish to receive such messages when he is away from home as and may activate this functionality prior to leaving his domicile. The program may be included on a program list selected by the user or identified by the set-top box, content provider or third party as being of interest to the user. The user may place the program on this list by selecting it for recording, placing the program in a list of favorites and so on. The program may also belong to a particular category or genre selected by the user such as tennis, hockey, classic movies, politics, sports, news programs and so on. Further, the user may identify programs for which he wishes to receive a text message by specifying a criterion that may be matched by metadata of the program, such as the name of an actor appearing in the program, a particular director, subject matter of interest and so forth. (A "program" is one example of the aforementioned video data and all references herein to a program should be understood to encompass video data as a whole.)

The user may have a programmed list of favorite television programs saved on, or accessible by, the set-top box 110. Even though the user may wish to view a program, he may not be available when the program is airing. For example, the user may not be at home or may not have access to the television. In this case, the user may program the set-top box to record the program. The user may also configure the set-top box to send a notification to the user's mobile device that the program is about to air. This notification may be text, multimedia and/or store and forward messages sent via SMS and/or multimedia message services ("MMS").

It should be noted that the message may be generated by the set-top box in response to an indication that the program will be received at some point in the future. For example, the set-top box may receive an indication from a content provider that the program will be transmitted to the set-top box within a certain time, such as two minutes. Presuming the program is on the user's preselected list, the set-top box may generate a message to the user's mobile device indicating that receipt of the program is imminent and requesting whether or not the user wishes the set-top box to stream the program to the mobile device. If the user indicates such streaming is desired, the set-top box may begin streaming the program when it is received from the content provider. Thus, the message may precede the actual receipt of the content by the set-top box in order to allow the user to see the entire program. It should also be noted that the indication from the content provider that the program will be transmitted may take the form of an electronic program guide entry, metadata, a message to the set-top box generated by the content provider's facility or any other suitable notice.

The mobile device may receive the aforementioned text message via the head end and/or the mobile network. For example, in a cable provider network, the head end may receive the program audiovisual signals to and distribute those signals to a certain set of subscribers. Alternatively, the mobile device may receive the message from the set-top box via a network.

Once the message is received, the user may, through the mobile device, initiate a reply to the set-top box indicating whether or not the user desires the set-top box to transmit the program to the mobile device. If the user so desires, the set-top box may stream the program to the user's mobile device.

In certain embodiments, the user may query the set-top box to determine what, if any, programs are being or to be received by the set-top box. In reply thereto, the set-top box may transmit program information to the mobile device and provide the user with the opportunity to view associated programs. It should be appreciated, then, that in such an embodiment the user is not constrained to interacting with the embodiment only in response to receiving a text message from the set-top box. Instead, the user may proactively initiate interaction between the mobile device and set-top box.

Figure 3:
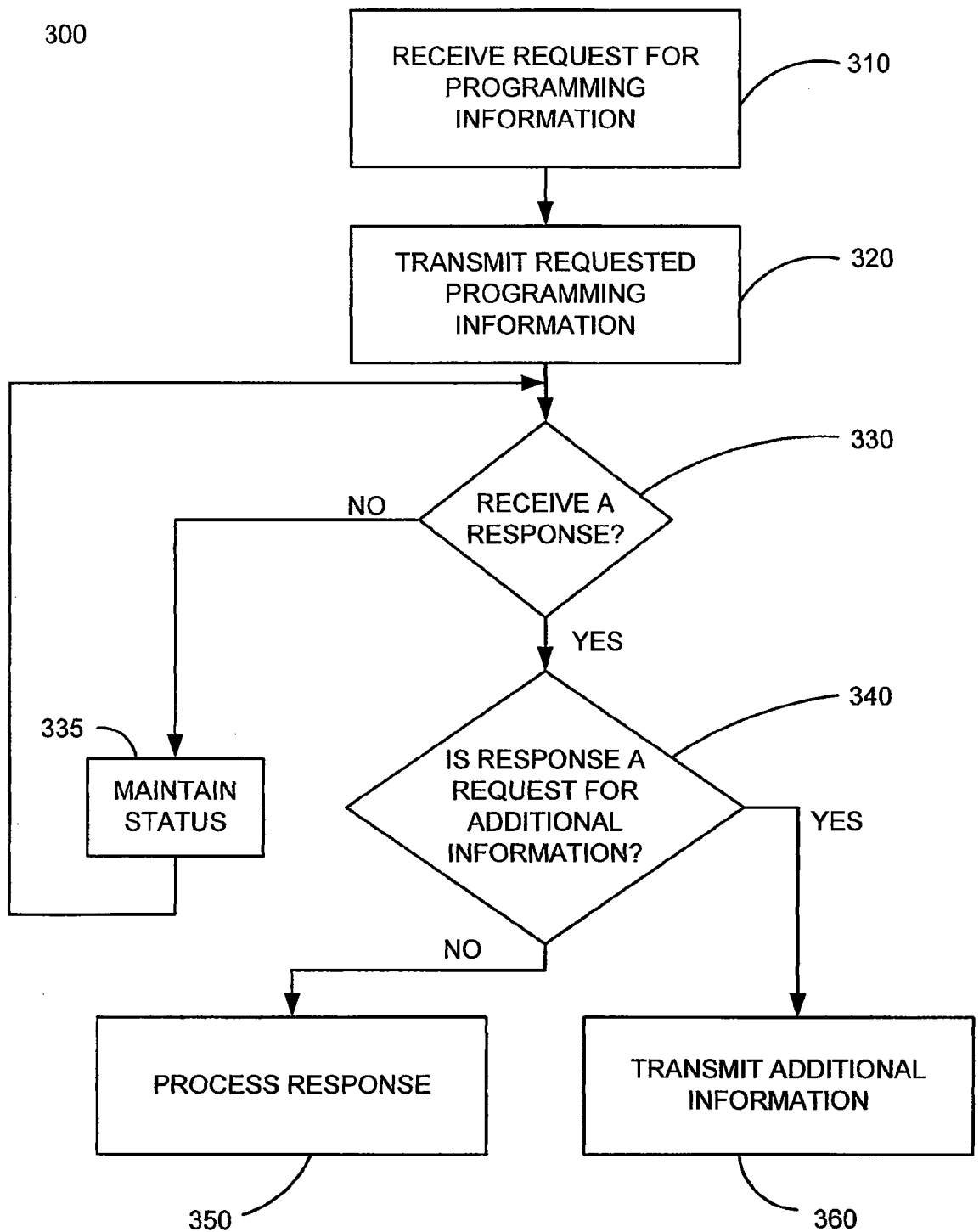
FIG. 3 is a flowchart depicting a method for transmitting data between two devices.

FIG. 3 is a flowchart generally describing one embodiment of a method 300 for transmitting and receiving multimedia content between two devices, specifically focusing on operations performed by the set-top box. The operations of method 300 are provided in an order shown for explanatory purposes only. Generally, the operations of method 300 may be performed in a different order than discussed herein.

In the operation of block 310, a set-top box may receive a request for programming information across a network from a mobile device. For example, a user may use a mobile device to send the request for programming information to the set-top box. The requested programming information may take the form of a general electronic programming guide, a list of programs that are received at a particular time, a list of times that a specific program is broadcast, information regarding a specific program such as the time it is to be received by the set-top box and/or the associated station identifier and so on.

In the operation of block 320, the set-top box may transmit the requested programming information. In embodiments in which the set-top box generates a message in response to particular user- or content provider-specified parameters, operation 310 may be omitted and the "requested programming information" of operation 320 may be a text message initiated by the set-top box as generally described above.

In the operation of block 330, the set-top determines if a response has been received from the mobile device. If not, the set-top box may maintain a default status as shown in block 335. However, if the set-top box did receive a response from the mobile device, operation 340 is executed.

In operation 340, the set-top box may determine whether the response is a request for additional information such as video data. If not, the set-top box may proceed to the operation of block 350 and process or ignore the response from the mobile device, as necessary. For example, the response from the mobile device may indicate that the set-top box need not send any further information to the user's mobile device, may indicate that the set-top box should record (but not transmit)

the program in question, may contain an operating instruction for the set-top box such as powering it on or off, and so forth.

Alternatively, the response may be a request for further or retransmitted programming information. In this case, the set-top box may respond as in the operation of block 320 and may transmit the requested programming information to the mobile device.

The set-top box may, however, determine in operation 340 that the response from the mobile device is a request for video data. If so, the embodiment may execute operation 360, and transmit the requested video data to the mobile device. The requested video data may be live data, in which case it is transmitted as the set-top box receives the video data from the satellite provider, or may be previously stored video data. Stated differently, the set-top box may either stream the video data to the mobile device or replay it from a storage device. The set-top box may transmit the video data via UMTS.

In an alternative embodiment of FIG. 3, the user may already have the relevant programming information and may request the video data from the set-top box as set forth in the operation of block 340. That is, the user may have previously used the mobile device to request programming information from another source such as a web page, may have previously downloaded the programming information onto the mobile phone and so on. If so, the alternative embodiment generally executes operations 340 through 360 but may omit operations 310 through 335.

Figure 4:
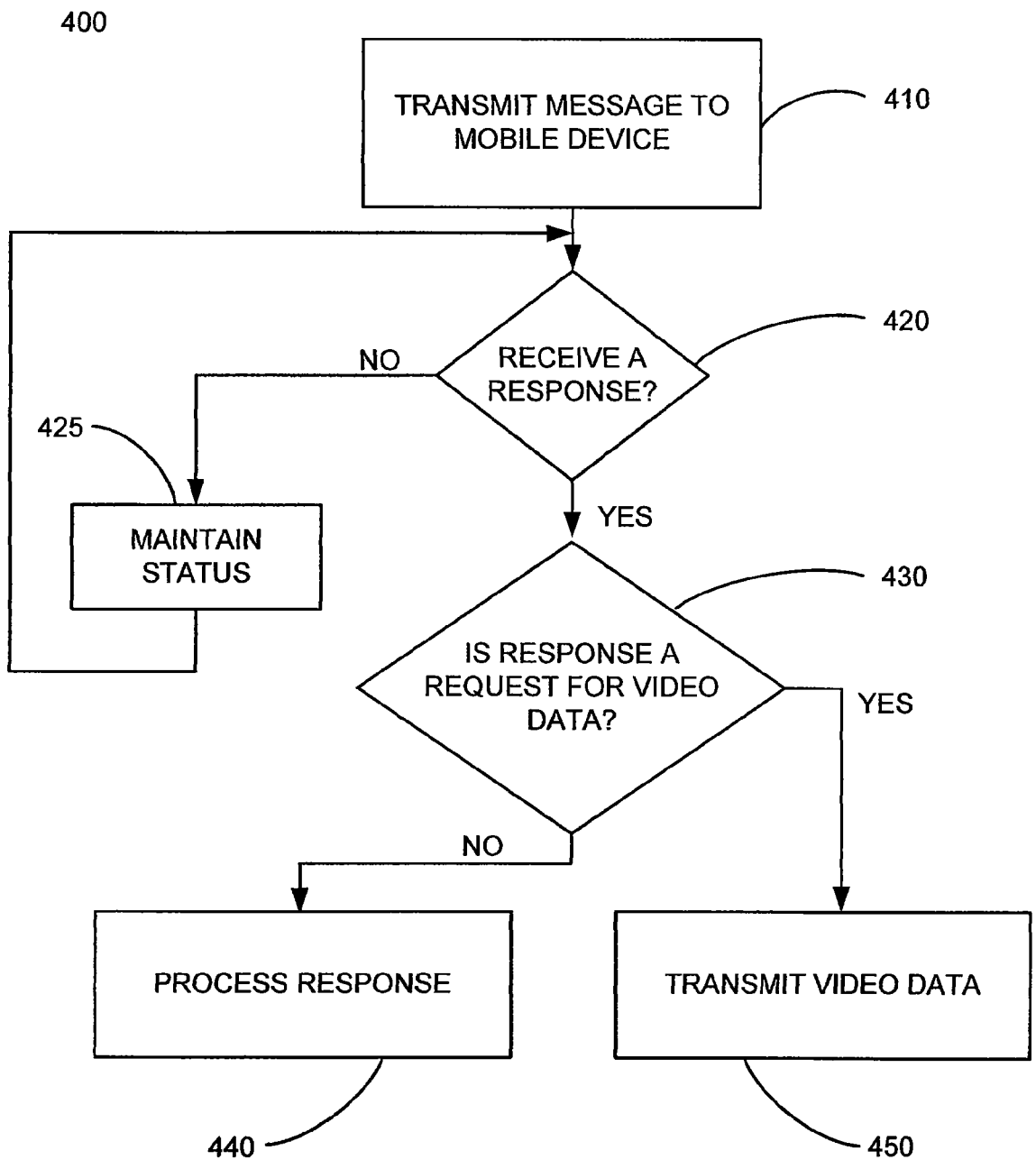
FIG. 4 is another flowchart depicting a method of transmitting video data between two devices.

FIG. 4 is a flowchart generally describing another method 400 for transmitting and receiving multimedia content between two devices, again focusing on the operations of a set-top box in such a method. The operations of method 400 are provided in an order shown for explanatory purposes only. Generally, the operations of method 400 may be performed in a different order than discussed herein.

In the operation of block 410, the set-top box may transmit a message to the user's mobile device. The transmitted message may provide a notification to the user regarding programs selected by the user. The selected programs may be programs previously selected for recording by the user, programs added to a list of favorites by the user, programs belonging to a favorite genre or category, and so on. In operation 420, the set-top box determines if it has received a response from the mobile device. If not, the set-top box may maintain its current status as in the operation of block 425 (e.g., transmit no data to the mobile device).

Alternatively, the set-top box may receive a response from the mobile device. In this case, in the operation of block 430, the set-top box determines whether the response from the mobile device is a request for video data. The set-top box may make the determination employing software, firmware, hardware, or any combination thereof that may be located in the set-top box. As in the operation of block 440, the mobile device response may request data such as programming information, thus the set-top box may process the mobile device response. As previously discussed, such programming information may include electronic program guide information, the airing times of a specific program, a list of programs that air at a certain time and so on. The set-top box may transmit the requested programming information via an IP connection, a wireless connection, a mobile network, UMTS and so on. In the case that the mobile device response requested video data, as shown in the operation of block 450, the set-top box may transmit the requested video data to the mobile device.

In another embodiment, the set-top box may transmit the video data to the user's mobile device as the set-top box receives the video data. Continuing the description of this embodiment, the user may have configured the set-top box to stream the video data to the user's mobile device when the user selected program aired.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

What is claimed is:

1. A method of transmitting data from a set top box to a mobile device, comprising:
    receiving at the set top box, from a content provider, an indication associated with the data, wherein the indication signals a beginning of the data being received at the receiver;
    determining, by the set top box, that the data has been pre-selected;
    in response to determining that the data has been pre-selected, generating a message, the message prompting a user of the mobile device to select whether to initiate transfer of the data from the receiver to the mobile device;
    transmitting the message to the mobile device;
    receiving a reply from the mobile device, the reply requesting initiation of the transfer of the data that was pre-selected from the set top box to the mobile device; and
    in response to receiving the reply requesting initiation of the transfer of the data from the set top box that has been preselected, transmitting the data from the set top box to the mobile device.

2. The method of claim 1, wherein the indication associated with the data comprises an indication that the data will be transmitted by the content provider within a predetermined time.

3. The method of claim 1, wherein the indication associated with the data is an initial portion of the data.

4. The method of claim 1, wherein the message is transmitted to the mobile device via at least one of a short message service or a multimedia message service.

5. The method of claim 1, wherein the message is transmitted from the set top box to a facility of the content provider, and retransmitted from the facility to the mobile device.

6. The method of claim 1, wherein the set top box is a television set top box.

7. The method of claim 1, wherein the mobile device is a mobile telephone.

8. The method of claim 1, wherein the operation of determining, by the set top box, that the data has been pre-selected comprises at least one of:
    determining that the user has pre-selected the data for streaming to the mobile device;
    determining that the content provider has pre-selected the data for streaming to the mobile device; and
    determining that the user has pre-selected the data for storage.

9. The method of claim 1, wherein the operation of determining, by the set top box, that the data has been pre-selected further comprises determining the data belongs to a user selected content category.

10. A method of transferring video content to a mobile device, comprising:

receiving user input, at a television receiver, identifying a television program to be transmitted by a content provider;

generating a reminder message regarding the television program based on the television program being pre-selected by a user via the user input;

transmitting the reminder message from the television receiver to a mobile device at a time associated with the reception of the television program by the television receiver;

receiving a response to the reminder message, at the television receiver, from the mobile device, the response requesting transmission of the television program that was pre-selected from the television receiver to the mobile device; and transmitting the television program from the television receiver to the mobile device responsive to the response that requested transmission of the television program that was pre-selected via the user input.

11. The method of claim 10, wherein transmitting the reminder message further comprises:

initiating transmission of a store-and-forward message from the television receiver to the mobile device.

12. The method of claim 10, wherein transmitting the reminder message further comprises:

initiating transmission of the reminder message prior to the time associated with reception of the television program.

13. The method of claim 10, wherein transmitting the message further comprises:

determining whether the user activated a reminder feature of a television receiver during a specified time period associated with the reception time of the television program; and transmitting the message responsive to determining that the user has activated the reminder feature.

14. The method of claim 10, wherein receiving the user input further comprises:

receiving the user input specifying a category of content; and determining whether the television program is associated with the specified category;

wherein generating the reminder message is performed responsive to determining that the television program is associated with the specified category.

15. The method of claim 10, further comprising:

processing the television program at the television receiver to authorize reception of the television program by the television receiver; and associating the television program with a subscriber identity module identifier of the mobile device, wherein the mobile device utilizes the subscriber identity module identifier to authorize presentation of the content on the mobile device.

16. A method of transferring video programming, comprising:

receiving, by a television set top box, a selection of a television program;

receiving the television program at the television set top box from a content source;

processing the data at the television receiver using a smart card to authorize reception of the programming by the television receiver;

in response to determining that the television program has been pre-selected, generating a message, the message prompting a user of a mobile device to select whether to initiate transfer of the television program from the television set top box to the mobile device;

transmitting the message from the television set top box to the mobile device;

receiving a reply by the television set top box from the mobile device, the reply requesting initiation of the transfer of the television program that was pre-selected from the television set top box to the mobile device;

associating the television program with a subscriber identity module identifier of the mobile device; and in response to receiving the reply requesting initiation of the transfer of the data from the receiver that has been preselected, transmitting the television program from the television set top box to the mobile device, wherein the mobile device utilizes the subscriber identity module identifier to authorize presentation of the content on the mobile device.

17. The method of claim 16, further comprising:

transmitting a reminder from the television set top box to the mobile device, wherein the reminder signals a beginning of the television program being received at the television set top box; and receiving a response to the reminder requesting initiation of transmission of the television program from the television set top box to the mobile device;

wherein transmitting the television program is performed responsive to receiving the response.

18. The method of claim 16, further comprising transmitting the television program from the television set top box to the mobile device via a universal mobile telecommunications service.

19. The method of claim 16, wherein transmitting the television program from the television program to a mobile device further comprises transmitting the data substantially as the television set top box receives the television program.

20. The method of claim 14, wherein the source is a satellite provider.

* * * * *